Dec. 9, 1969   J. L. HVALE ETAL   3,482,332
TACHISTOSCOPE HAVING CARD ADVANCE MEANS
Filed Jan. 4, 1968   3 Sheets-Sheet 1
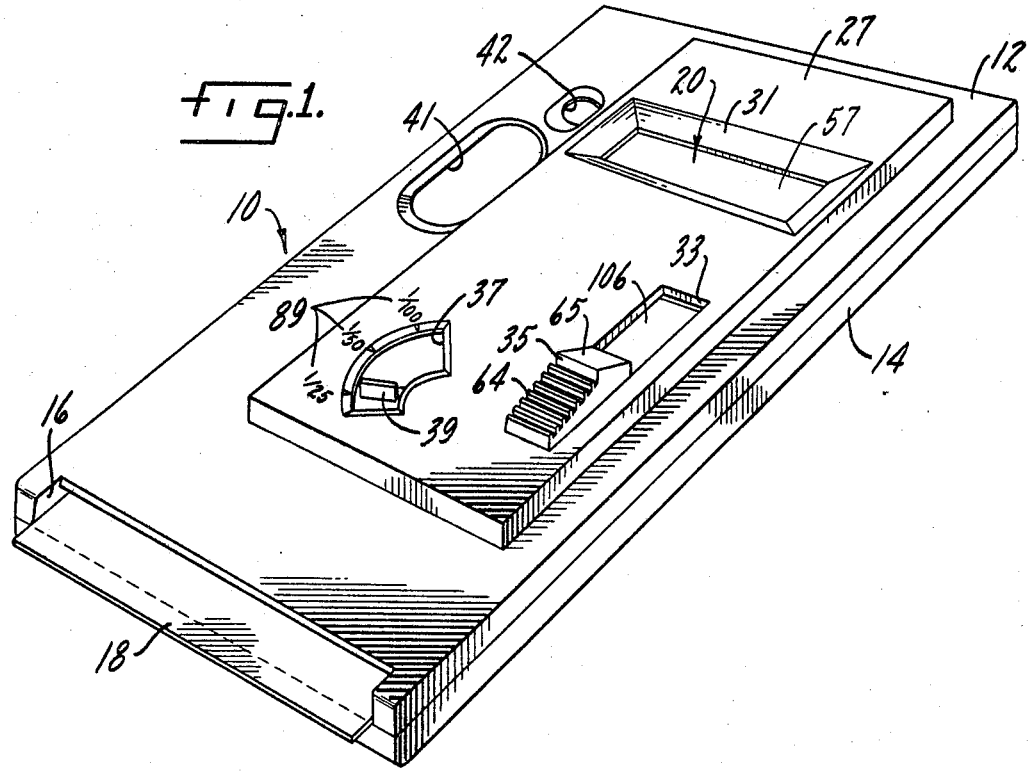
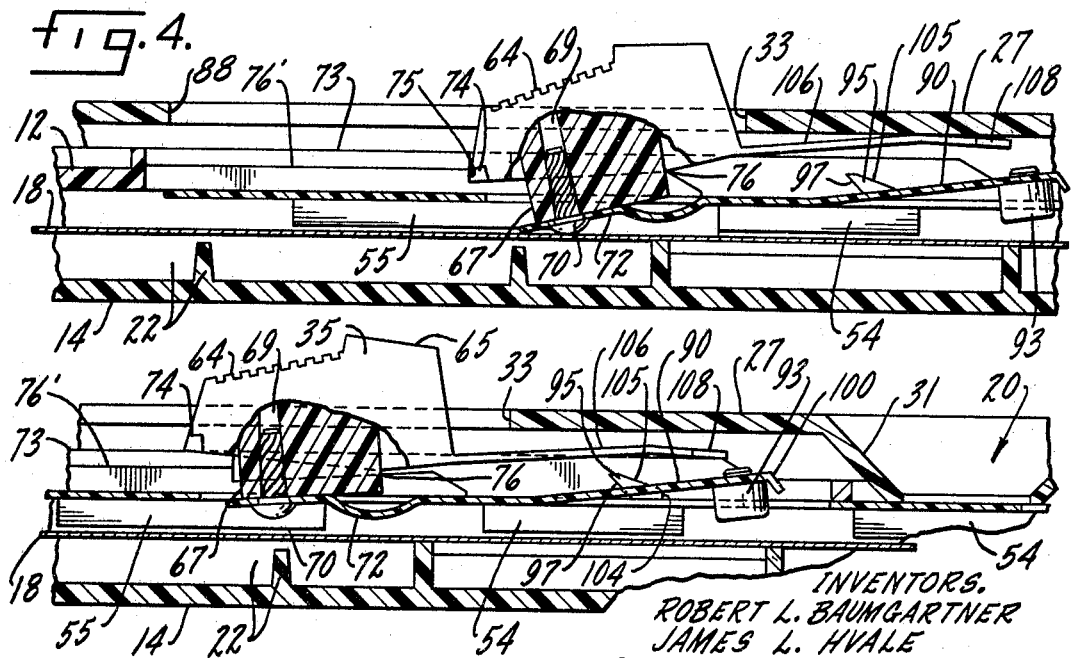
INVENTORS.
ROBERT L. BAUMGARTNER
JAMES L. HVALE
BY Mann, Brown & McWilliams
Attorneys.

Dec. 9, 1969  J. L. HVALE ETAL  3,482,332
TACHISTOSCOPE HAVING CARD ADVANCE MEANS
Filed Jan. 4, 1968  3 Sheets-Sheet 2
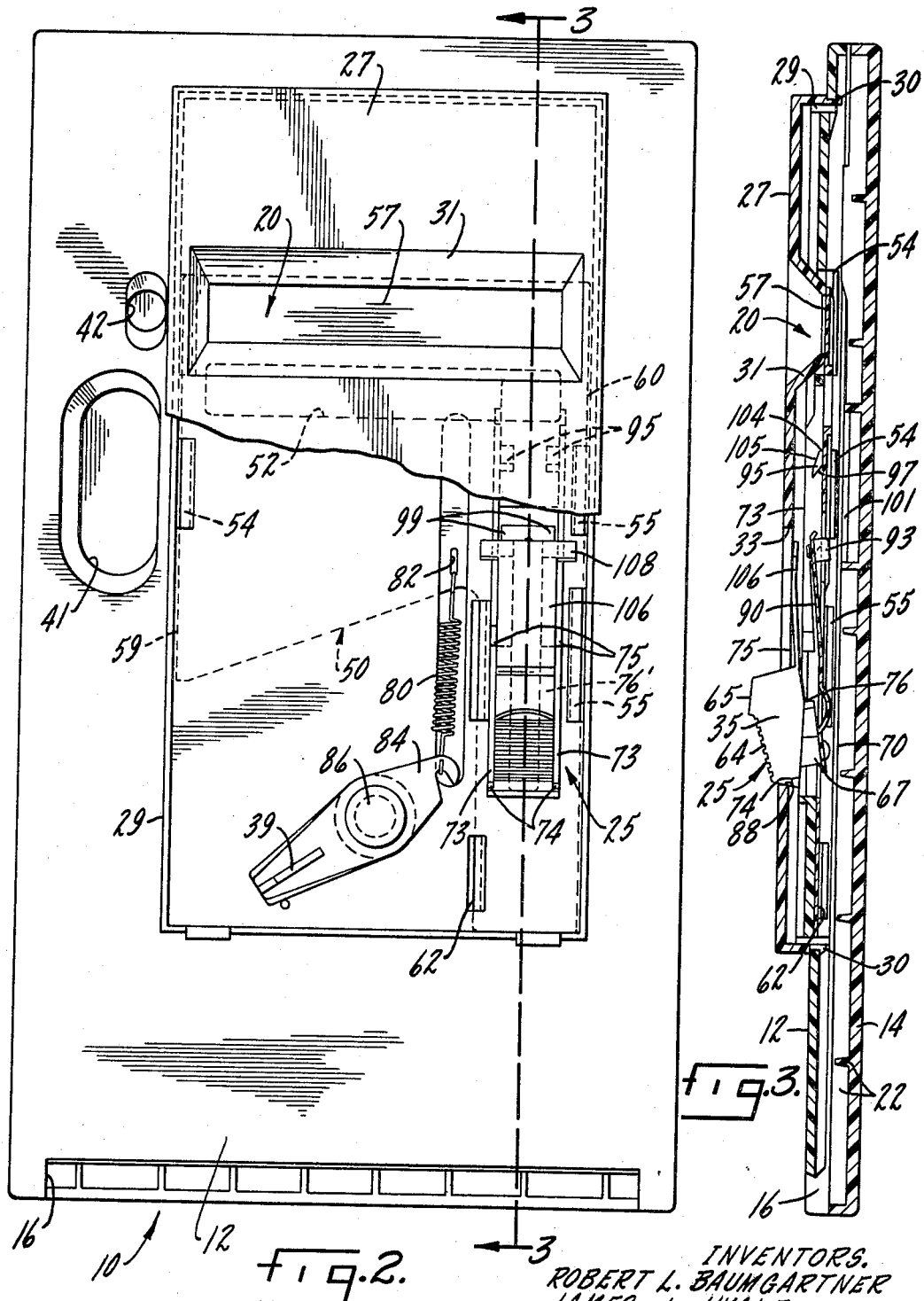
INVENTORS.
ROBERT L. BAUMGARTNER
JAMES L. HVALE
BY Mann, Brown & McWilliams
Attorneys.

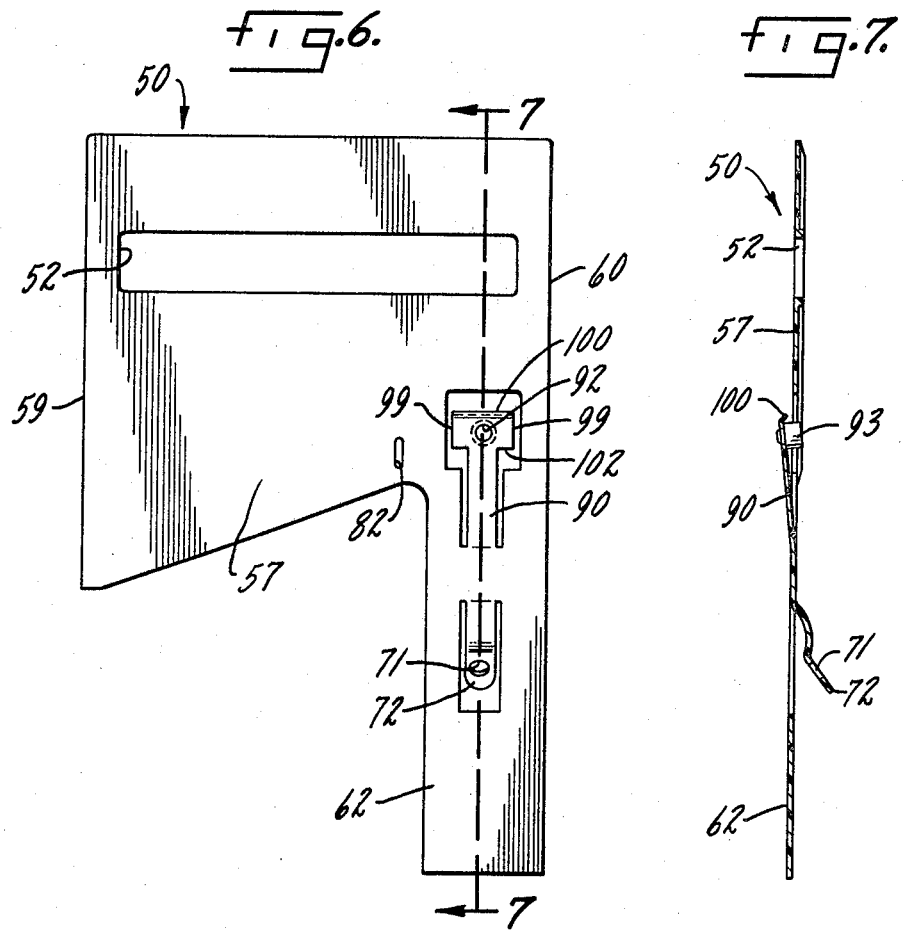

_United States Patent Office_ 3,482,332
Patented Dec. 9, 1969

3,482,332
TACHISTOSCOPE HAVING CARD ADVANCE MEANS
James L. Hvale, Chicago, and Robert L. Baumgartner, Elgin, Ill., assignors to Markus-Campbell Company, a corporation of Illinois
Filed Jan. 4, 1968, Ser. No. 695,628
Int. Cl. G09b 17/00
U.S. Cl. 35—35              9 Claims

ABSTRACT OF THE DISCLOSURE

A durable tachistoscope of simplified construction with provision for advancing a card, having a series of targets printed thereon, through the device in successive steps incident to the cocking of a shutter mechanism, preventing preview of the target prior to timed opening and closing of a shutter, and permitting leisurely checking of the target previously subjected to flash recognition during operation of the device to bring the next target into operative position.

BRIEF SUMMARY OF THE INVENTION

The invention, for which the following is a detailed disclosure, pertains to tachistoscopic devices, and has particular, although not exclusive, utility in the area of hand-held near point tachistoscopic devices of the type employed as a training tool in flash recognition method reading improvement instruction.

The improvement of one's reading skills has, in recent years, gained great significance, and with it, the flash recognition method of reading improvement has gained substantial popularity. This method involves a schedule of exercises which are employed to train the eye and mind to absorb a group of words or characters as a group, as distinguished from viewing and acknowledging a sentence or group of words as individual words making up that group or sentence. This form of training, hereinafter sometimes referred to as flash recognition, has been acknowledged as one method of developing and improving one's reading skills for years.

Many devices have been constructed as aids to flash recognition training techniques. The majority of these devices have a common operative mode in that they permit the user to obtain a timed glimpse of a target, which usually consists of a group of words or numbers, and by repeating the "glimpse," the eye and mind are trained to view and recognize groups as a whole, and in short periods of time, often ranging between $\frac{1}{25}$th and $\frac{1}{100}$ths of a second.

While early tachistoscopes involved the use of heavy equipment, such as movie projectors, electronic reading tables, and the like, the size and cost of such equipment severely limited its use. Usually courses would be offered to groups, rather than individuals, using such equipment. It has been recognized, however, that the degree of interest in reading improvement is high, and that in order to reach the mass market, it is necessary to provide a tachistoscopic effect with a device which is salable, preferably by mail, to the home market. It was this realization that gave birth to the concept of hand-held tachistoscopic devices.

The very early hand-held tachistoscopic devices usable for home or correspondence training, comprised a small cardboard device which housed a shutter biased in one direction by a simple rubber band. Front and rear panels which housed the shutter had aligned windows in them, and the shutter itself had a window of approximately the same size. The device would be placed over a target and the shutter pulled down so as to block the view through the window in the front and rear panels. Release of the shutter would then provide a glimpse of the target as the window in the shutter moved past the opening in the panels.

As the demand for such devices grew, they became more sophisticated, and while the operative principles remained essentially the same, features have been added which make the devices more accurate and usable. The present invention comprises an improvement in such hand-held devices.

It is an object of the present invention to provide a tachistoscopic device of the type herein described, wherein a card having a series of targets printed thereon is advanced automatically through the device in successive steps, incident to cocking of the shutter mechanism.

It is another object of the invention to provide a near point tachistoscopic device wherein a preview of the target to be used is prevented prior to actual operation of the device, thereby preventing any possibility of the user obtaining an uninterested look at the taget prior to the actual training exercise.

It is another and still further object of the invention to provide a hand-held tachistoscopic device having an improved shutter mechanism which is exceptionally durable, and of simplified construction, thereby minimizing the necessity of repair and/or replacement of the device. This feature makes the device especially desirable for the home market which is usually covered by correspondence or mailing techniques, thus making repair more inconvenient.

These and other objects and advantages of the present invention will become apparent from the following detailed description when taken in conjunction with the drawings wherein:

FIGURE 1 is a perspective of a hand-held near point tachistoscopic device of the type to which the present invention pertains;

FIGURE 2 is a top plan view of the device of FIGURE 1 partially fragmented to illustrate specific details of construction;

FIGURE 3 is a section of the device of FIGURES 1 and 2, taken along lines 3—3 of FIGURE 2;

FIGURES 4 and 5 are enlarged fragmentary views similar to FIGURE 3 illustrating the shutter mechanism and two of its operating positions.

FIGURE 6 is a top plan view of the shutter; and

FIGURE 7 is a cross-section taken on line 7—7 of FIGURE 6.

DETAILED DESCRIPTION

Referring to the drawings, FIGURE 1 illustrates an exemplary hand-held tachistoscopic device of the type for which the present invention has particular significance. The device 10 comprises a casing having, in this particular instance, upper and lower housing sections 12 and 14. It will be appreciated at the outset that the specific housing arrangement, and details of construction may vary to a substantial extent from that which is to be here described. The principal features of the invention reside in the shutter mechanism, which, as will become evident, has utility in a variety of environments. The description immediately following is intended only to detail a specific arrangement in which the invention has thus far been proven successful in practice.

The upper and lower rectangular housing members 12 and 14 may be snap-fitted together, or joined in any other appropriate way. Reference to FIGURE 3 will assist in the visualization of the particular structure here employed. The material used in the formation of the housing members may be any material which is readily formed, and which is sufficiently durable to be used by an inexperienced operator over an acceptable length of time without breakdown. Any well-known durable structural plastic material is suitable, such as high impact polystyrene.

The upper and lower housing members 12 and 14 together define a longitudinal channel or slot 16 which is sufficiently large to accommodate a target card 18. The target card, as may be seen in FIGURES 4 and 5, is slidable through the narrow channel defined between the housing members so as to permit the selective positioning of the targets beneath a viewing aperture, indicated generally at 20.

The card is supported by longitudinal ribs and the lower member 14 is strengthened generally by both longitudinal and horizontal ribs 22. The upper housing member is also strengthened with longitudinal ribs. Sufficient space is left between the ribs on the upper and lower housing members to accommodate the target card therebetween.

The shutter mechanism, which is indicated generally at 25, is supported principally on the upper housing member 12 within a rigid cover or cap 27 which fits over an upstanding peripheral flange 29 molded integrally as a part of the upper housing member. The cover is fastened to housing member 12 by means of hook-snaps 30. The cap, which is conveniently formed of the same material as the housing itself, is formed with a series of sloping sidewalls 31 which define rectangular viewing aperture 20. The cap is also formed with elongated slot 33 through which a shutter-operating button or knob 35 protrudes. Still another arcuate aperture 37 is formed in the cap through which a finger-operated shutter-tensioning indicator 39 protrudes.

Completing the overall description of the device, the upper housing member 12 is, in this exemplary case, formed with a pair of apertures 41 and 42 along one edge thereof, the first mentioned of which opens directly to the card 18 and may be used to manipulate the card through the channel 16 with a finger. The latter aperture 42 is aligned with a series of consecutive identifying integers on the card which indicate the number of the target beneath the viewing aperture 20.

The shutter mechanism 25, which is embodied in the device broadly described, is the heart of the tachistoscopic device of the present invention. It is the function of the shutter to cover the target on the card disposed beneath the viewing aperture, except for a predetermined short period of time, in this instance varying between $\frac{1}{25}$ and $\frac{1}{200}$ of a second. This mechanism, which is similar in function to the diaphragm shutter or focal plane shutters used in cameras is necessarily quite different in design and far less complicated in order to bereadily usable and durable in the hands of inexperienced users.

The shutter mechanism which comprises a principal aspect of the present invention is built around a unique shutter element of the type illustrated specifically in FIGURES 6 and 7.

With reference now to those figures, a shutter or shutter plate indicated generally at 50 as provided, having a width greater than the width of the viewing aperture 20 of the device, and itself being constructed with a slot 52 which, in this instance, is approximately of the same dimension as the viewing aperture. It will be appreciated, however, that the specific size of the slot or window 52 may vary without departure from the invention, and that any variation would have a bearing upon the exposure time which the shutter itself is capable of achieving.

The shutter 50 is conveniently formed of an opaque durable plastic material haivng suitable resilience and preferably a low friction coefficient on the surfaces thereof such as nylon, although it can be made of metal. The shutter is mounted for reciprocal movement in channels formed in the upper housing member 12 by means of projections 54 and 55 disposed above and below the shutter position by an amount slightly greater than the shutter thickness. The projections 54 and 55 are preferably made of high impact polystyrene and preferably formed integrally with the upper housing member and cover, and are discontinuous or sapced apart only of sufficient size to adequately support the shutter. This has been done in order that the amount of friction between the engaged surface of the shutter plate and the projections might be minimized. Accordingly, the shutter is freely movable within the channel while being supported in the proper plane of movement. The shutter itself, in order to minimize the amonut of material, while providing the necessary strength and stability required, comprises a main body portion 57, the width of which is adequate to permit the edges 59 and 60 to ride well within the channel defined by the projections 54 and 55. The shutter is also provided with a leg or extension 62, which not only increases the length of the engaging edge 60 to provide additional stability for the device, but also permits, in accordance with the inevntion, operative controls to be connected with the shutter.

The shutter, which is movable between a cocked position and a dwell or relaxed position, is manually controlled by the finger-operated knob 35. This knob, which projects through the cap 27 of the device, is formed with a rear knurled or serrated surface 64, and a forward chamfered surface 65. A boss 67 depending from the rear portion of the main body of the knob is formed with a hold 69 which conveniently receives a screw 70 to secure the knob to the shutter through a hole 71 formed in a rear tongue 72 (see FIG. 6). The tongue is, in accordance with the invention, formed integrally with the shutter by removing a U-shaped portion of the leg 62. The knob 35, in order to insure smooth operation of the shutter mechanism, is supported for movement with the shutter on tracks 73, formed in the upper housing member, by means of ears 74 formed integrally with the knob and which ride on the tracks. The tracks or guideways insure smooth operation along with maintaining proper relationship between the shutter plate 50 and the knob during all phases of the operation of the device. Additionally they eliminate or minimize bending stresses which would otherwise occur in the shutter plate as a consequence of downward finger pressure on the knob 35. The knob is additionally supported by virtue of the fact that the fulcrum 76 rides on the surface 76'.

Additionally, in order to provide a quick locking arrangement for the shutter in its cocked position, a pair of ears 74 project from either side of the knob and the track or guideway 73 is notched as at 75. The notches are located at a position to engage ears 74 in the forward or cocked position of the shutter. The principal function of the ears is to prevent the knob from lifting out of slot 33. Upon moving the knob to the forward position, pressure on the serrated edge 64 of the knob (which, because of the angle at which it is formed, is downward as well as forward), will cause the ears 74 to fall into the notches, thereby retaining the entire shutter mechanism in its cocked position. The inclined plane of the bottom rear portion of knob 35 gives the notch 75 a better bite into the corner of the knob.

It is a feature of the invention that total shutter control is achieved through use of the single knob 35. This is accomplished by establishing a relationship between the shutter and knob which permits a rocking motion to be imparted to the knob. Thus, pressure on the serrated surface 64, which will have both a forward and downward component, permits cocking of the shutter and locking the same in that position. Operation of the device as part of a training exercise may then be achieved by downward pressure on the chamfered surface 65 which, because of the relationship between the knob and the track or guideway in which it rides, causes the rear portion of the knob, with the ears 74, to lift out of the notches 75. To facilitate this, it will be noted that the bottom of the knob is formed to be provided with a fulcrum or pivot point 76 which rests on the surface of the track, and acts as a point about which the knob can be pivoted.

Additionally, in order to normally bias the knob into an attitude such as that observable in FIGURES 3 and 4, the tongue 72 is, in accordance with the invention, provided, in any suitable fashion, with a curl or preset, as may be seen in FIGURE 7. The rear portion of the tongue which carries the aperture 71 is, therefore, normally slanted downward and away from the plane of the shutter mechanism. Since the boss 67 is formed to the rear of the knob, the knob is then normally biased to a position with the ears 74 on the track 73. Accordingly, the ears 74 will tend to be biased into the notches 75 without substantial effort by the user. Furthermore, this initial bias provided by the integrally formed tongue portion provides a resiliency which returns the knob to its proper position with respect to the track once the shutter mechanism is activated.

As in previously known devices of this general type, the shutter is cocked or biased against the action of a spring 80 which is hooked into a slot 82 formed in the main body portion 57 of the shutter plate 50. The spring 80, which is at rest in compression, engages one end of a pointer 84 which is pivoted on the upper housing on a pin 86. The pointer is movable by means of the indicator member 39 which protrudes through the top 27 of the device to positions which will vary the spring tension, and thus preload the spring so as to achieve a predetermined timed relationship between the sighting aperture 20 and the window 52 in the shutter.

Thus, in operation with the shutter in its cocked position, the window portion 52 will reside above viewing aperture 20, as seen in FIGURE 2. Release of the shutter mechanism by downward pressure on the chamfered surface 65 of the knob will permit the spring 80 to pull the shutter rearwardly at a rate determined by the preload applied to it by positioning the pointer 84. The device achieves a dwell or rest position, as seen in FIGURE 2, when the rear face of the knob abuts the slot end 88 (see FIG. 3). In this position, the window 52 is below the sighting aperture 20. Appropriate markings 89 are made on the edge of aperture 37 to indicate shutter closure times for various settings of indicator 39.

Another feature of the shutter mechanism is the automatic advance of the target card 18 during the cocking of the shutter mechanism. This is achieved by bringing the shutter mechanism and the card 18 into friction contact for a limited amount of travel of the shutter mechanism, equal to the distance between adjacent targets on the card.

With reference now particularly to FIGURES 6 and 7, there is provided, in keeping with this aspect of the invention, a cantilevered target card advance arm 90. As will be seen in FIGURE 6, the arm 90 is formed integrally with the shutter 50. By means of removing material from the leg 62, the arm takes shape as there shown. The arm is provided with an aperture 92 into which a button or pad 93, which may be rubber or any other high-friction, low-wear material, is fastened. With reference to FIGURES 4 and 5, it will be seen that the arm 90 is given an initial preset in an upward direction in order to assure that it is well away from the surface of the card until the proper time during normal operation of the device.

In order to achieve precise movement of the card, the arm, and thus the button, is cammed into engagement with the card during a portion of the cocking stroke of the shutter. This is accomplished by providing a pair of camming protrusions 95 in the upper housing 12 of the device. The extensions have a slanted camming surface 97 which is aligned with, and adapted to engage, the lateral extending ears 99 formed on the arm 90 (see FIG. 6). It will also be observed that the leading edge 100 of the arm is bent downwardly so as to provide smooth engagement with the camming surface 97.

Reference will now be had to FIGURES 4 and 5 where the action of this camming arrangement may be readily seen. As the shutter is advanced to its cocking position, the leading edge 100 of the cantilevered arm 90 will engage the camming surface 97 and be forced downwardly into engagement with the card causing the card to move forward with the shutter. A small rectangular shaped platform 101, supported from the lower housing 14, is formed below camming protrusions 95, in order to better support the card during contact with pad 93. As the shutter continues to advance, the ears 99 will pass beyond the cam, and eventually the trailing edge 102 of these ears moves past the leading edge 104 of the cam. At this instant the preset or original bias formed in the arm will cause the pad 93 to spring upwardly and out of engagement with the card. The relationship between the cam and ears 99 is such that the card will be given a forward impetus equal to the precise distance between targets printed on the card 18. In this manner, a new target is moved into position for the next exercise. On the rearward stroke of the shutter the ears 99 ride over the sloping surfaces 105 of cams 95 and the friction pad 93 does not touch the target card.

Still another feature of the invention, related to the foregoing construction, resides in the placement of the cam 95 in relation to the stroke of the shutter. This placement is such that the window 52 is aligned with the sighting aperture 20 prior to engagement of ears 99 by cams 95 and movement of the card. In this way, the user can leisurely observe the target upon which he has previously practiced to determine the accuracy of his identification thereof during the next cocking stroke. As the shutter is moved further, the sighting aperture is closed by the shutter, the window having passed the aperture before the new target is in place beneath the sighting aperture, and the cam action thus moves the new target into position below the sighting aperture. In this way the user has no chance to preview the next target prior to actual use of the device.

In order to prevent the user from placing his fingers in slot 33 through which the shutter operating button or knob 35 protrudes, and to protect the target advance member 90 so as to lessen the possibility of breaking, tamper plate 106 is provided.

The tamper plate 106 (FIGURES 2 and 3) of approximately the same width as slot 33 is attached or formed integrally with the bottom side of the forward end of the shutter operating button or knob 35 and is preferably of a light plastic material such as nylon having inherent resiliency and flexibility. Tamper plate 106 has projecting ears 108 adapted to ride between the inside face of cap 27 and tracks 73.

It will be seen, therefore, that apparatus is provided which is durable and of simplified construction, thereby minimizing the necessity of repair and/or the replacement of the device.

We claim:
1. A tachistoscopic device for use in providing a predetermined timed exposure of a target comprising
 (a) a housing,
 (b) a channel in said housing for accommodation of a card having a series of targets thereon,
 (c) a sighting aperture in said housing positioned to expose individual targets on the card in the channel,
 (d) a shutter mechanism having a shutter disposed for reciprocal movement in said housing and a target card advance member.
 (e) an opening in said shutter aligned with sighting aperture,
 (f) said advance member comprising a reciprocable actuating member, a resilient arm fastened at one end to said actuating member, and a friction tip on the other end of said arm,
 (g) a cam in said housing positioned to engage said other end of said arm and urge said tip against the target card to advance the same to the next target position.

2. A tachistoscopic device in accordance with claim 1, in which
 (h) said cam is positioned to cause the other end of said resilient arm to engage said card when said shutter mechanism is advanced to position in which the shutter opening and sighting aperture are in alignment.

3. A tachistoscopic device in accordance with claim 1, in which
   (i) said reciprocable actuating member is a knob fastened to said shutter and projecting through an elongated slot in said housing.

4. A tachistoscopic device in accordance with claim 1, in which
   (j) said actuating member and said housing are provided with cooperating means for holding the shutter mechanism in cocked position.

5. A tachistoscopic device in accordance with claim 4, in which
   (k) said shutter is composed of plastic material and said resilient arm is formed integrally with said shutter.

6. A tachistoscopic device in accordance with claim 4, in which
   (l) said cooperating means comprises tracks formed internally of said housing,
   (m) ears extending laterally from said actuating member and adapted to ride on said tracks, and
   (n) notches in said tracks adapted to accommodate said ears.

7. A tachistoscopic device in accordance with claim 3, including
   (o) a tamper plate formed integrally with said knob, substantially covering said elongated slot and resilient arm.

8. A tachistoscopic device in accordance with claim 6, in which
   (p) said cam is positioned to cause the other end of said resilient arm to engage said card when said shutter mechanism is advanced to position in which the shutter opening and sighting aperture are in alignment.

9. A tachistoscopic device in accordance with claim 8, in which
   (q) said reciprocable actuating member is a knob fastened to said shutter and projecting through an elongated slot in said housing,
   (r) said knob having a fulcrumed surface between said tracks whereby to enable said knob to be tilted out of engagement with said notches.

References Cited

UNITED STATES PATENTS

| | | | |
|---|---|---|---|
| 2,647,329 | 8/1953 | Bloch et al. | 35—35 |
| 3,358,391 | 12/1967 | Warren et al. | 35—35 |

EUGENE R. CAPOZIO, Primary Examiner

WILLIAM H. GRIEB, Assistant Examiner